United States Patent
Kaku (10) Patent No.: US 10,644,976 B2
(45) Date of Patent: May 5, 2020

(54) RELAY APPARATUS

(71) Applicant: DENSO CORPORATION, Kariya, Aichi-pref. (JP)

(72) Inventor: Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 423 days.

(21) Appl. No.: 15/137,057

(22) Filed: Apr. 25, 2016

(65) Prior Publication Data
US 2016/0344601 A1   Nov. 24, 2016

(30) Foreign Application Priority Data

May 18, 2015 (JP) .................. 2015-101178
Dec. 11, 2015 (JP) .................. 2015-242221

(51) Int. Cl.
*H04L 12/26* (2006.01)
*H04L 12/823* (2013.01)
(Continued)

(52) U.S. Cl.
CPC ............ *H04L 43/0847* (2013.01); *H04L 1/00* (2013.01); *H04L 12/413* (2013.01); *H04L 12/46* (2013.01);
(Continued)

(58) Field of Classification Search
CPC ... H04L 49/555; H04L 49/351; H04L 49/552; H04L 12/46; H04L 12/413; H04L 12/4641; H04L 43/0847; H04L 1/00
See application file for complete search history.

(56) References Cited

U.S. PATENT DOCUMENTS 4,777,330 A * 10/1988 Nakayashiki ......... H04L 12/437
178/69 R
4,899,142 A * 2/1990 Nakayashiki ......... H04L 12/437
340/2.7
(Continued)

FOREIGN PATENT DOCUMENTS

JP   H09-181771 A   7/1997
JP   2000-209251 A  7/2000
(Continued)

OTHER PUBLICATIONS

"Internet Control Message Protocol supporting TCP/IP protocol", http://www.atmarkit.co.jp/ait/articles/0306/13/news002.html. Jun. 13, 2003 (and partial English translation).

*Primary Examiner* — Omer S Mian
*Assistant Examiner* — Bailor C. Hsu
(74) *Attorney, Agent, or Firm* — Posz Law Group, PLC (57) ABSTRACT

A relay apparatus which relays a communication among a plurality of control devices includes a plurality of ports connected with the plurality of control devices, respectively, via a plurality of communication lines; a determination section determining whether a reception frame received by each of the plurality of ports is normal or abnormal; a discarding section discarding the reception frame when the determination section determines that the reception frame is abnormal; and an abnormality notifying section, when the determination section determines that the reception frame is abnormal, notifying an abnormality occurrence in the reception frame to a transmission source device, wherein the transmission source device is one of the control devices that transmitted the reception frame.

10 Claims, 6 Drawing Sheets

(51) Int. Cl.
*H04L 12/931* (2013.01)
*H04L 12/939* (2013.01)
*H04L 12/413* (2006.01)
*H04L 1/00* (2006.01)
*H04L 12/46* (2006.01)

(52) U.S. Cl.
CPC ........ *H04L 12/4641* (2013.01); *H04L 49/555* (2013.01); *H04L 49/351* (2013.01); *H04L 49/552* (2013.01)

(56) References Cited

U.S. PATENT DOCUMENTS

| | | | | |
|---|---|---|---|---|
| 5,271,000 A * | 12/1993 | Engbersen | ............... | H04L 43/50 370/244 |
| 7,738,366 B2 * | 6/2010 | Uddenberg | ......... | H04L 43/0817 370/229 |
| 7,760,702 B2 * | 7/2010 | Deng | ................. | H04B 7/15592 370/351 |
| 7,774,641 B2 * | 8/2010 | Inoue | .................... | G06F 11/201 714/5.11 |
| 7,971,109 B2 * | 6/2011 | Andreoletti | ............... | H04L 1/22 714/708 |
| 8,149,689 B2 * | 4/2012 | Endo | ....................... | H04L 12/66 370/217 |
| 8,238,228 B2 * | 8/2012 | Saltsidis | ............... | H04L 49/557 370/216 |
| 8,489,665 B2 * | 7/2013 | Sato | ......................... | H04L 1/00 708/491 |
| 8,554,904 B2 * | 10/2013 | Yasuie | ................ | H04L 41/0677 709/224 |
| 8,565,236 B2 * | 10/2013 | Shimada | ............. | H04L 12/4633 370/229 |
| 8,571,091 B2 * | 10/2013 | Dalsgaard | ............ | H04W 76/28 375/219 |
| 8,769,157 B2 * | 7/2014 | Maruyama | .............. | H04J 3/085 709/251 |
| 9,432,857 B2 * | 8/2016 | Watanabe | ............. | H04W 24/04 |
| 9,667,548 B2 * | 5/2017 | Ishikawa | ................ | H04L 45/74 |
| 9,769,041 B2 * | 9/2017 | Johannes | ............... | H04L 12/437 |
| 9,794,286 B2 * | 10/2017 | Otsuka | ................ | H04L 12/4625 |
| 2002/0194507 A1 | 12/2002 | Kanzawa et al. | | |
| 2006/0013155 A1 * | 1/2006 | Spaete, Jr. | .......... | H04L 12/2805 370/320 |
| 2006/0182199 A1 * | 8/2006 | Hong | .................... | H04L 1/0003 375/299 |
| 2008/0123583 A1 * | 5/2008 | Shiizaki | ............... | H04B 7/0671 370/315 |
| 2012/0005743 A1 * | 1/2012 | Kitazawa | ............ | H04L 63/1425 726/13 |
| 2014/0334300 A1 * | 11/2014 | Horihata | ........... | H04L 12/40039 370/230 |

FOREIGN PATENT DOCUMENTS

| | | |
|---|---|---|
| JP | 2005-229330 A | 8/2005 |
| JP | 2006-173693 A | 6/2006 |
| JP | 2015-2525 A | 1/2015 |

* cited by examiner

FIG. 2

| PREAMBLE 8 BYTES | DESTINATION MAC ADDRESS 6 BYTES | SOURCE MAC ADDRESS 6 BYTES | VLAN TAG 4 BYTES | TYPE 2 BYTES | DATA 46 – 1500 BYTES | FCS 4 BYTES |

RELAY APPARATUS

CROSS REFERENCE TO RELATED APPLICATION

This application is based on Japanese Patent Application No. 2015-101178 filed on May 18, 2015 and Japanese Patent Application No. 2015-242221 filed on Dec. 11, 2015, the disclosures of which are incorporated herein by references.

TECHNICAL FIELD

The present disclosure relates to a relay apparatus.

BACKGROUND

As disclosed in JP H9-181771 A, in an Ethernet (registered trademark) based communication system, an Ethernet switch utilized as a relay apparatus detects an abnormality occurrence in a received frame and discards the abnormal frame.

In the above system, when the Ethernet switch discards the abnormal frame, a transmission source of the frame cannot recognize the discarding of frame. Thus, the transmission source of the frame cannot take measures, such as retransmission of the frame against the frame discarding.

SUMMARY

In view of the foregoing difficulties, it is an object of the present disclosure to provide a relay apparatus that notifies of an abnormality occurrence in a frame to a transmission source of the frame when the frame is discarded due to the abnormality.

According to a first aspect of the present disclosure, a relay apparatus which relays a communication among multiple control devices includes multiple ports, a determination section, a discarding section, and an abnormality notifying section. The ports are connected with the control devices, respectively, via communication lines. The determination section determines whether a reception frame received by each of the ports is normal or abnormal. The discarding section discards the reception frame when the determination section determines that the reception frame is abnormal. The abnormality notifying section notifies, when the determination section determines that the reception frame is abnormal, an abnormality occurrence in the reception frame to a transmission source device. Herein, the transmission source device is one of the control devices that transmitted the reception frame.

With the above relay apparatus, the transmission source device can be notified of the abnormality occurrence in the transmitted frame by the abnormality occurrence in the reception frame transmitted from the relay apparatus. Thus, the transmission source device can take measures, such as retransmission of the frame against the abnormal frame.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe embodiments to which the present disclosure is applied.

(First Embodiment)

Figure 1:
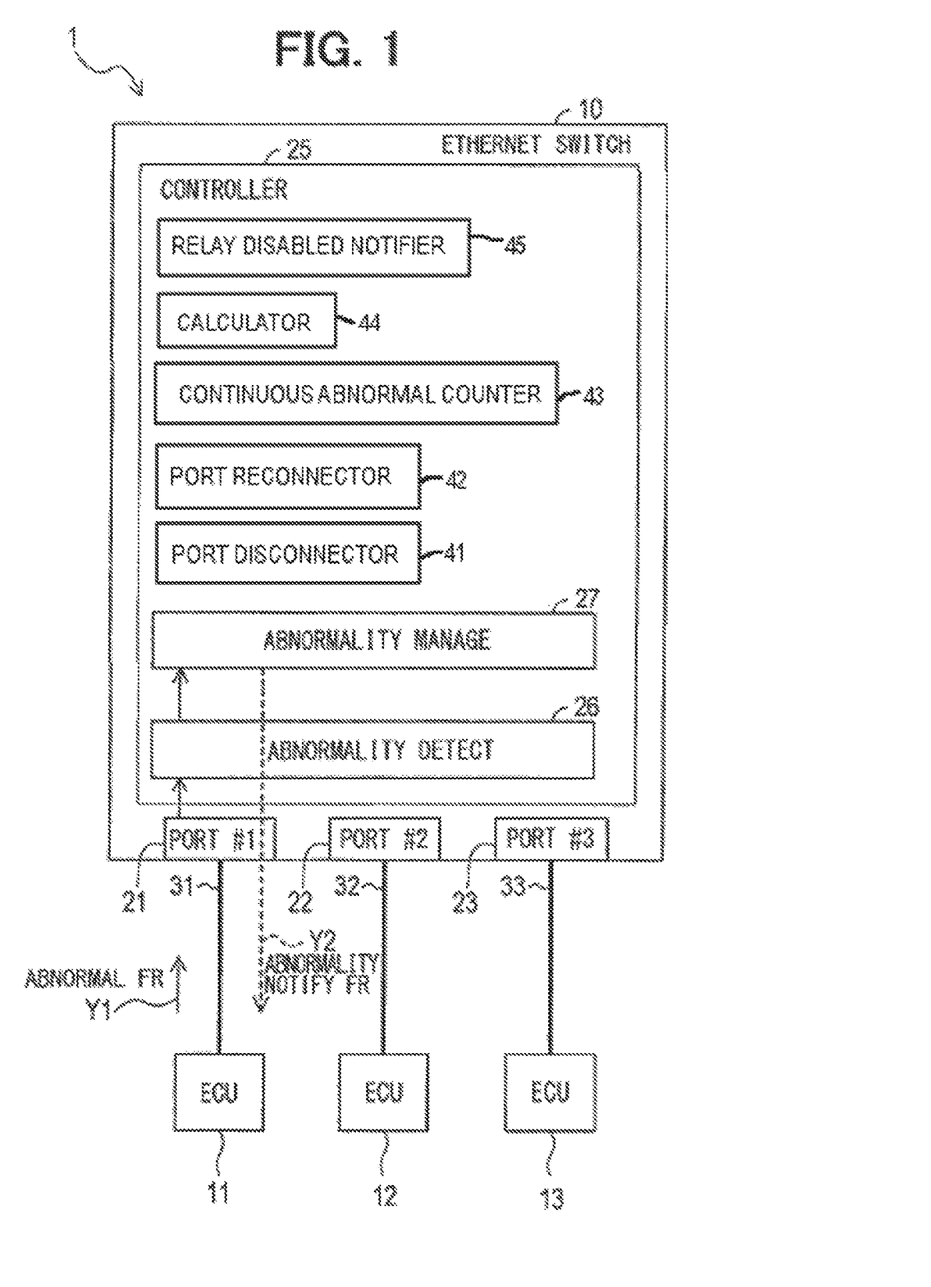
FIG. 1 is a diagram showing a configuration of a communication system according to an embodiment of the present disclosure.

As shown in FIG. 1, an Ethernet network communication system equipped to a vehicle will be described as an example of a communication system 1 according to an embodiment of the present disclosure. The communication system 1 includes an Ethernet switch 10 and multiple control devices. In the present embodiment, as an example, three control devices 11, 12, 13 are provided in the communication system 1 and each control device is provided by an electronic control unit (ECU). In the present disclosure, the Ethernet switch 10 is provided as an example of the relay apparatus.

The Ethernet switch 10 includes a controller 25 and multiple ports corresponding to the multiple control devices, respectively. In the example shown in FIG. 1, the Ethernet switch 10 has three ports 21, 22, 23. The controller 25 includes an abnormality detecting section (ABNORMALITY DETECT) 26, an abnormality managing section (ABNORMALITY MANAGE) 27, a port disconnector 41, a port reconnector 42, a continuous abnormal counter 43, a calculator 44, and a relay disabled notifier 45.

The ECUs 11, 12, 13 are connected, as communication nodes, with the ports 21, 22, 23 of the Ethernet switch 10 through respective communication lines 31, 32, 33. The Ethernet switch 10 relays, according to an Ethernet standard, communications among the ECUs 11, 12, 13. The controller 25 performs the relay process. The controller 25 may be provided by an integrated circuit (IC) which is configured by logic circuits, or the controller 25 may be provided by a microcomputer.

Figure 2:
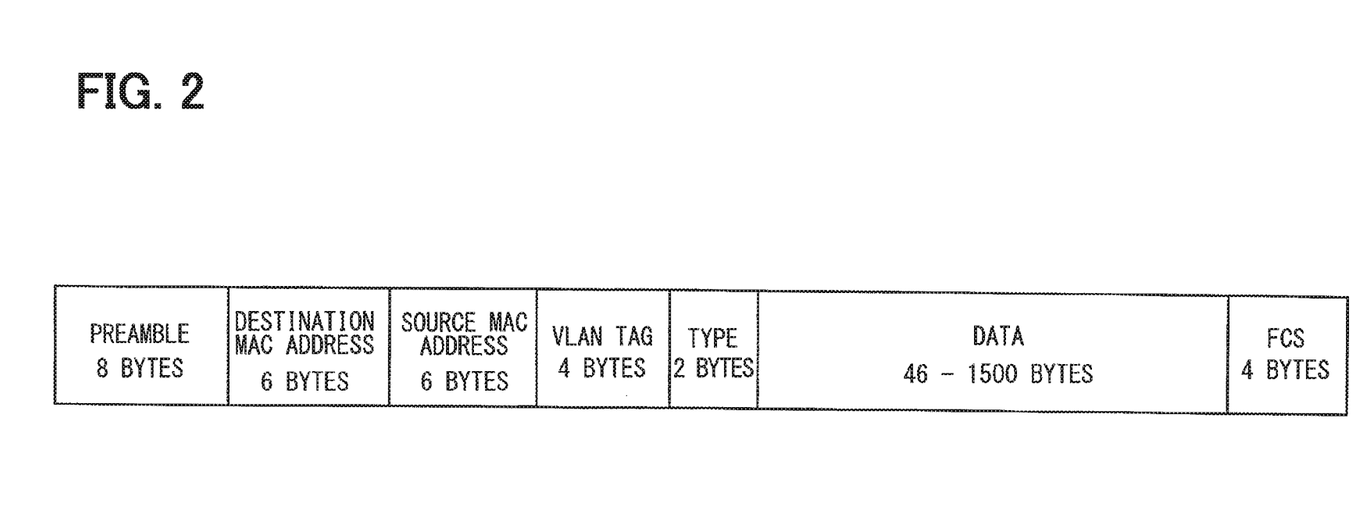
FIG. 2 is a diagram showing a configuration of a frame according to Ethernet standard.

The ECUs 11, 12, 13 are communicably connected with one another through the communication lines 31, 32, 33 and the Ethernet switch 10, and perform communications with one another according to the Ethernet standard. The frame communicated among the ECUs 11, 12, 13 is an Ethernet frame that defines a virtual local area network (VLAN) tag as shown in FIG. 2. The frame communicated among the ECUs 11, 12, 13 is a communication frame relayed by the Ethernet switch 10. The Ethernet frame exemplary shown in FIG. 2 has fields that respectively define 8 bytes of preamble, 6 bytes of destination media access control (MAC) address, 6 bytes of source MAC address, 4 bytes of VLAN tag, 2 bytes of data, 46 to 1500 bytes of data, and 4 bytes of frame check sequence (FCS).

Figure 3:
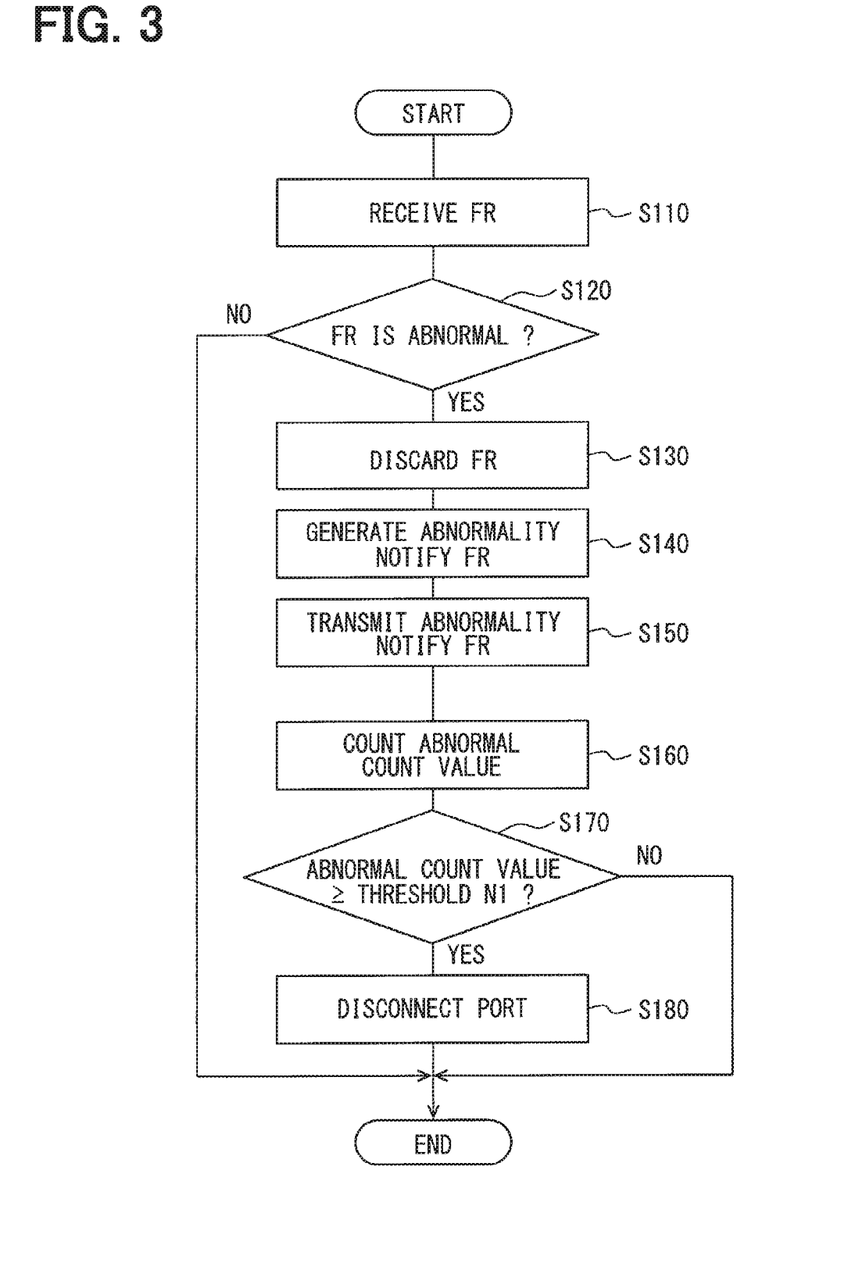
FIG. 3 is a flowchart of an abnormality treating process according to a first embodiment of the present disclosure.

The following will describe an abnormality treating process executed by the controller 25 of the Ethernet switch 10 with reference to FIG. 3. The abnormality treating process shown in FIG. 3 is executed by the controller 25 for each port 21, 22, 23 of the Ethernet switch 10. The controller 25 starts the abnormality treating process when a frame is transmitted from one of the ECUs 11, 12, 13 and is inputted to the corresponding port.

In the following description, the port to which the abnormality treating process is being carried out is referred to as a subject port. Further, a frame received by each port 21, 22 23 in the Ethernet switch 10 is referred to as a reception frame. In the process shown in FIG. 3, the abnormality detecting section 26 of the controller 25 executes the process shown in S120 and S130, and the abnormality managing section 27 of the controller 25 executes the process shown in S140 and the followings.

As shown in FIG. 3, at S110 of the abnormality treating process, the controller 25 receives the frame inputted to the subject port. Herein, the frame inputted to the subject port is the frame transmitted from the ECU connected to the subject port.

At 120, the controller 25 determines whether the frame received at S110 is normal or abnormal. For example, the controller 25 may determine the received frame is abnormal when FCS error is detected in the received frame or when a total number of bits of each field of the received frame is different from a predetermined normal value. Herein, the FCS error is an error related to data included in the received frame and is detected by using error detection purpose data stored in FCS field of the received frame.

The controller 25 performs, at least, bit number determination and error detection. In the bit number determination, the controller 25 determines whether the bit number of the received frame is equal to a normal value. In the error detection, the controller 25 detects a data error in the received frame using the error detection purpose data included in the received frame. When the controller 25 determines that the bit number of the received frame is not equal to the normal value in the bit number determination, or detects a data error in the received frame, the controller 25 determines that the received frame is abnormal. The controller 25 determines that the received frame is normal only when the controller 25 determines that the bit number of the received frame is equal to the normal value and detects no data error in the received frame.

In the bit number determination, the controller 25 may determine whether a bit number of each field of the received frame is equal to a predetermined normal value. As another example, the controller 25 may determine whether a bit number of a predetermined field of the received frame is equal to a predetermined normal value. As further example, the controller 25 may determine whether a bit number of the entire received frame is equal to a predetermined normal value. That is, a target of the bit number determination may be the entire reception frame or partial reception frame.

The following will describe the error detection process in details. First, the ECU, which transmits the frame as a transmission source, performs a computation with respect to a specified field of the frame to be transmitted using a predetermined algorithm. Then, the ECU stores the computation result as the error detection purpose data in the FCS field of the frame to be transmitted. In the present embodiment, the fields storing the destination MAC address and the data are used as the specified field for computing the error detection purpose data.

The controller 25 performs a computation to the fields storing the destination MAC address and the data in the received frame using an algorithm identical to the algorithm used in the transmission source ECU. Then, the controller 25 compares the computation result with the error detection purpose data included in the FCS field of the received frame. When the computation result is equal to the error detection purpose data, the controller 25 determines that there is no data error in the received frame. When the computation result is different from the error detection purpose data, the controller 25 determines an error is occurred in the received frame. In the present embodiment, cyclic redundancy check (CRC) is used as the computation algorithm for detecting the error. Alternatively, other algorithms may be used for detecting the error in the received frame.

At S120, when the controller 25 determines that the received frame is normal, that is not abnormal (S120: NO), the controller 25 ends the abnormality treating process. In this case, the controller 25 performs the relay process for relaying the received frame to the destination. For example, a non-volatile memory (not shown) included in the controller 25 may store a relay table that indicates a correspondence between the destination MAC address and the port. That is, the relay table specifies a frame having one MAC address should be transmitted to a predefined port. The controller 25 relays the received frame based on the relay table. For example, when the destination MAC address of the frame received through the port 21 indicates the ECU 13, the controller 25 transmits the frame through the port 23.

At S120, when the controller 25 determines that the received frame is abnormal (S120: YES), the controller 25 discards the received frame at S130. Specifically, the controller 25 deletes the received frame from the volatile memory.

At S130, when the received frame is discarded, in the controller 25, the abnormality detecting section 26 notifies an abnormality of the received frame to the abnormality managing section 27. Then, the abnormality managing section 27 of the controller 25 executes the process at S140 and the followings.

At S140, the controller 25 generates an abnormality notification frame (ABNORMALITY NOTIFY FR). The abnormality notification frame is a frame prepared for notifying of an abnormality occurred in the received frame to the ECU, which is a transmission source of the frame determined to be abnormal. In the following description, the frame determined to be abnormal is referred to as abnormal frame (ABNORMAL FR). The transmission source ECU functions as a transmission source device.

Each field of the abnormality notification frame, for example, a specified position of the VLAN tag field, stores an Identification code indicating the frame is the abnormality notification frame. The destination MAC address field of the abnormality notification frame stores MAC address indicating the transmission source ECU. For example, when the subject port is port 21, the transmission source ECU is ECU 11. Thus, the destination MAC address field of the abnormality notification frame stores the MAC address indicating the ECU 11.

The data field of the abnormality notification frame stores the data which is identical to the data stored in the data field of the received frame by making a copy of the data. Thus, when receiving the abnormality notification frame, the transmission source ECU can identify, based on the data stored in the data field of the abnormality notification frame, the abnormality notification frame corresponds to which frame the transmission source ECU has transmitted. Thus, the transmission source ECU can determine which frame has abnormality. The data stored in the data field of the abnormality notification frame functions as abnormal frame information. Based on the abnormal frame information, the transmission source ECU is capable of identifying the abnormality notification frame corresponds to which frame the transmission source ECU has transmitted.

As another example, a sequence number of the frame may be stored in the VLAN tag field of the frame transmitted from the ECU 11, 12, 13. In this case, the controller 25 may store the sequence number stored in the VLAN tag field of the received frame in the VLAN tag field of the abnormality notification frame. With this configuration, the transmission source ECU can identify, based on the sequence number included in the abnormality notification frame, the abnormality notification frame corresponds which frame the transmission source ECU has transmitted. In this case, the sequence number stored in the abnormality notification frame functions as the abnormal frame information.

For example, the sequence number may be stored in a predetermined position in the data field of the abnormality notification frame. In another example, both the sequence number included in the abnormality notification frame and the data stored in the data field of the abnormality notification frame can be used as the abnormal frame information included in the abnormality notification frame. In this case, when the sequence number included in the abnormality notification frame or the data stored in the data field of the abnormality notification frame is damaged, the remaining one can function as the abnormal frame information. Thus, the transmission source ECU can more correctly and reliably identify which frame has abnormality based on the abnormal frame information remained in the abnormality notification frame. In this case, the abnormal frame information remained in the abnormality notification frame is one of the sequence number or the data stored in the data field.

After generating the abnormality notification frame, at S150, the controller 25 transmits the generated abnormality notification frame to the subject port. Herein, the subject port is a port that has received the abnormal frame. The transmission source ECU of the abnormal frame receives the abnormality notification frame from the controller 25 via the corresponding port.

At S160, the controller 25 counts the abnormal count value. Specifically, the controller 25 increments the abnormal count value by one in response to each reception of abnormal frame. The abnormal count value indicates the count of determination in which the frame received at S120 is determined to be abnormal. The abnormal count value has an initial value of zero.

At S170, the controller 25 determines whether the abnormal count value is equal to or greater than a predetermined threshold N1. For example, the predetermined threshold N1 may be set to 20. When determining that the abnormal count value is smaller than the predetermined threshold N1 (S170: NO), the controller 25 ends the abnormality treating process. When determining that the abnormal count value is equal to or greater than the predetermined threshold N1 (S170: YES), the controller 25 proceeds to S180.

At S180, the port disconnector 41 in the controller 25 performs a port disconnection process in order to disconnect the subject port, and then ends the abnormality treating process. When the subject port is disconnected, the subject port is excluded from relay destinations of the communication. More specifically, when the subject port is disconnected, the relay of the communication is not carried out between the subject port and any one of other ports. Thus, when the subject port is disconnected, other port does not output a frame destined for the subject port and the subject port does not output a frame destined for any one of other ports.

For example, as the port disconnection process, the controller 25 performs a process for deactivating the relay process of the frame between the subject port and any one of other ports. For another example, the controller 25 may deactivate an operation of a transceiver included in the subject port. That is, the controller 25 may stop the operation of the transceiver included in the subject port. Herein, the transceiver is a transceiving circuit for inputting and outputting communication signals. As the deactivating operation of the transceiver, the controller 25 may shut off a power supply to the transceiver.

The following will describe an operation example of the abnormality treating process. For example, as shown by an arrow Y1 in FIG. 1, suppose that the ECU 11 transmits a frame destined for the ECU 12 and the ECU 13, and the frame is damaged by an abnormality or noise occurred in the communication line 31.

In the above case, the abnormality detecting section 26 included in the controller 25 of the Ethernet switch 10 determines that the received frame is abnormal. Then, the abnormality detecting section 26 discards the received frame and notifies of the abnormality in the received frame to the abnormality managing section 27. Then, as shown by an arrow Y2 in FIG. 2, the abnormality managing section 27 of the controller 25 transmits the abnormality notification frame to the transmission source ECU 11 which has transmitted the frame determined to be abnormal.

In the Ethernet switch 10, when determining that the count by which the frame received through the port 21 is determined to be abnormal is equal to or greater than the predetermined threshold N1, the abnormality managing section 27 disconnects the port 21.

The following will describe advantages provided by the above configuration. When discarding the received frame which is determined to be abnormal, the controller 25 of the Ethernet switch 10 transmits the abnormality notification frame to the transmission source ECU of the frame determined to be abnormal. Thus, the transmission source ECU can be notified, by the abnormality notification frame transmitted from the Ethernet switch 10, that an abnormality has occurred in the transmitted frame. Thus, the transmission source ECU can take measures, such as retransmission of the frame against the abnormal frame.

Further, when the transmission source ECU receives the abnormality notification frame, the transmission source ECU can generally determine that an abnormality has occurred in the previously transmitted frame. As described above, the abnormality notification frame includes the abnormal frame information. Thus, the transmission source ECU can correctly identify, based on the abnormal frame information included in the abnormality notification frame, which frame has become abnormal after being transmitted. Thus, the transmission source ECU can correctly specify and select which frame needs to be transmitted again.

For each port 21, 22, 23, the controller 25 of the Ethernet switch 10 counts the abnormal frames. Specifically, for each of the multiple ports, when the frame received by the port is determined to be abnormal, the controller 25 increments the abnormal count value corresponding to the port by one at S160. When the abnormal count value of any one of the port 21, 22, 23 increases to be equal to or greater than the predetermined threshold N1, the controller 25 disconnects the corresponding port (S170: YES and S180).

With the above configuration, the port which has an unstable signal transmission path can be excluded from the destinations of the relay operation, and this can improve a reliability of the communication. Herein, the signal transmission path includes the communication line. Further, with the above configuration, a frame which possibly has an abnormality can be surely avoided from being relayed among the ECUs.

The controller 25 performs the port disconnection process for disconnecting the port which receives the abnormal frame by deactivating the transceiver of the corresponding port. With this configuration, a power consumption of the Ethernet switch 10 can be saved.

In the present embodiment, the process executed at S120 functions as an example of a determination section, the process executed at S130 functions as an example of a discarding section, and the process executed at S150 functions as an example of an abnormality notifying section. Further, the process executed at S160 functions as an example of an abnormality counter, and the process executed at S170 and S180 functions as a port disconnecting section.

(Second Embodiment)

The following will describe a communication system 1 according to a second embodiment of the present disclosure. In the following description of the second embodiment and other embodiments, same reference symbol will be used for the same or equivalent part or process with the first embodiment.

Figure 4:
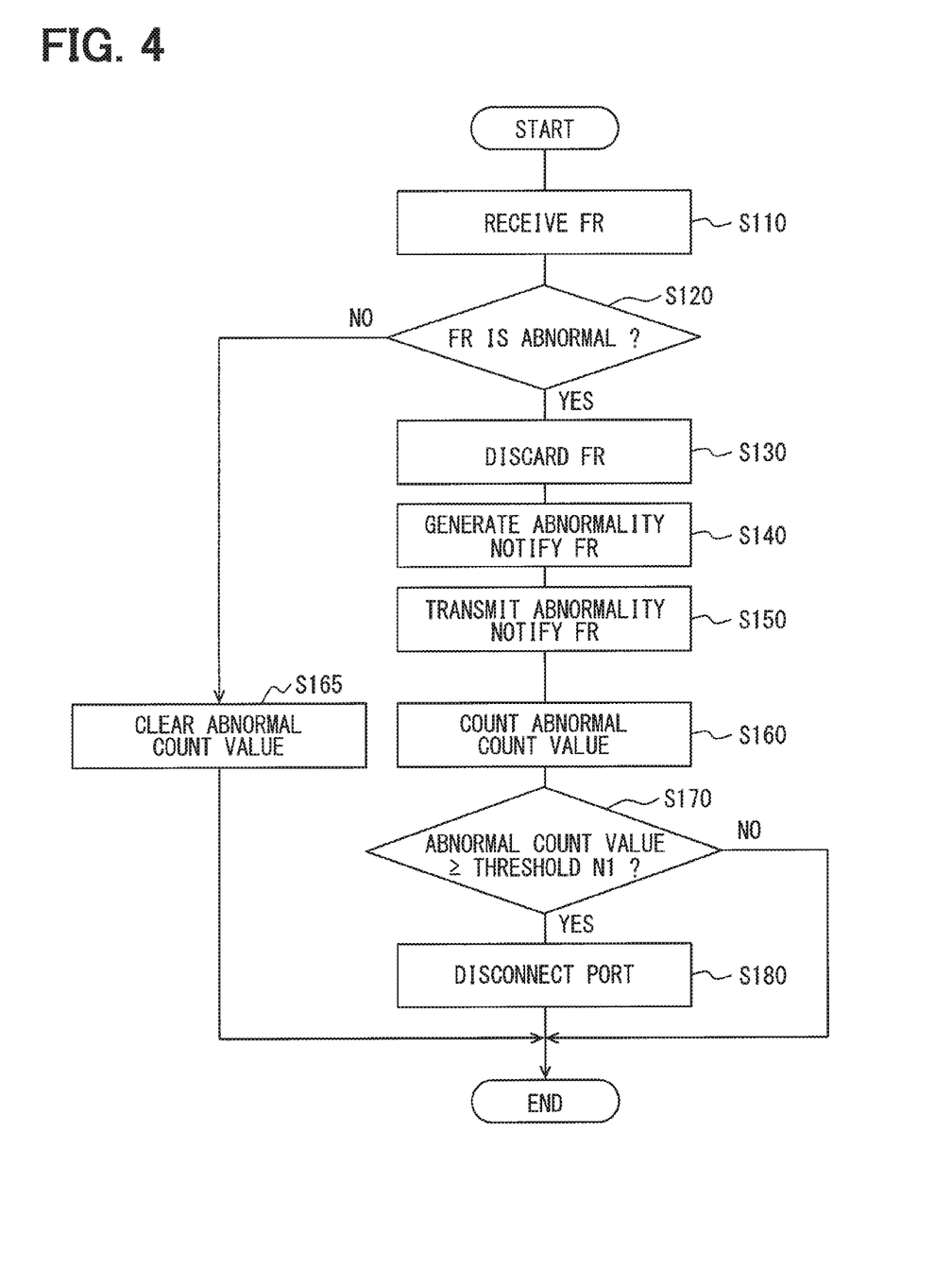
FIG. 4 is a flowchart of an abnormality treating process according to a second embodiment of the present disclosure.

Compared with the first embodiment, in the communication system 1 according to the present embodiment, the controller 25 of the Ethernet switch 10 executes an abnormality treating process shown in FIG. 4 instead of the abnormality treating process shown in FIG. 3. Compared with the abnormality treating process shown in FIG. 3, the abnormality treating process shown in FIG. 4 additionally execute S165. In the flowcharts shown in FIG. 3 to FIG. 6, "frame" is abbreviated as "FR".

As shown in FIG. 4, when the controller 25 determines that the received frame is normal at S120 (S120: NO), the controller 25 proceeds to S165 and dears the abnormal count value and resets the abnormal count value to zero. Then, the controller 25 ends the abnormality treating process.

In the above configuration, the abnormal count value incremented at S160 indicates the count by which the frames received at S120 are continuously determined to be abnormal. As described above, in the Ethernet switch 10 according to the present embodiment, for each port 21, 22, 23, the continuous abnormal counter 43 in the controller 25 records the abnormal count value by which the frames received at S120 are continuously determined to be abnormal (S160, S165). When the abnormal count value corresponding to one of the ports 21, 22, 23 becomes equal to or greater than the predetermined threshold N1, the controller 25 disconnects the corresponding port (S170: YES and S180).

According to the Ethernet switch 10 in the present embodiment, advantages similar to the first embodiment can be provided. Further, among the ports 21, 22, 23, the port which is surely determined to have the unstable signal transmission path is excluded from the destinations of the relay operation by the continuous determinations of abnormal frames.

In the present embodiment, the process executed at S160, S165 shown in FIG. 4 functions as an example of a continuous abnormal counter, and the process executed at S170 and S180 functions as an example of the port disconnecting section.

(Third Embodiment)

The following will describe a communication system according to a third embodiment of the present disclosure. Compared with the second embodiment, in the communication system according to the present embodiment, the controller 25 of the Ethernet switch 10 executes an abnormality treating process shown in FIG. 5 instead of the abnormality treating process shown in FIG. 4. Compared with the abnormality treating process shown in FIG. 4, the abnormality treating process shown in FIG. 5 executes S210, S220, S230, S240, S250 and S260 instead of S160, S170, and S180 shown in FIG. 4.

Figure 5:
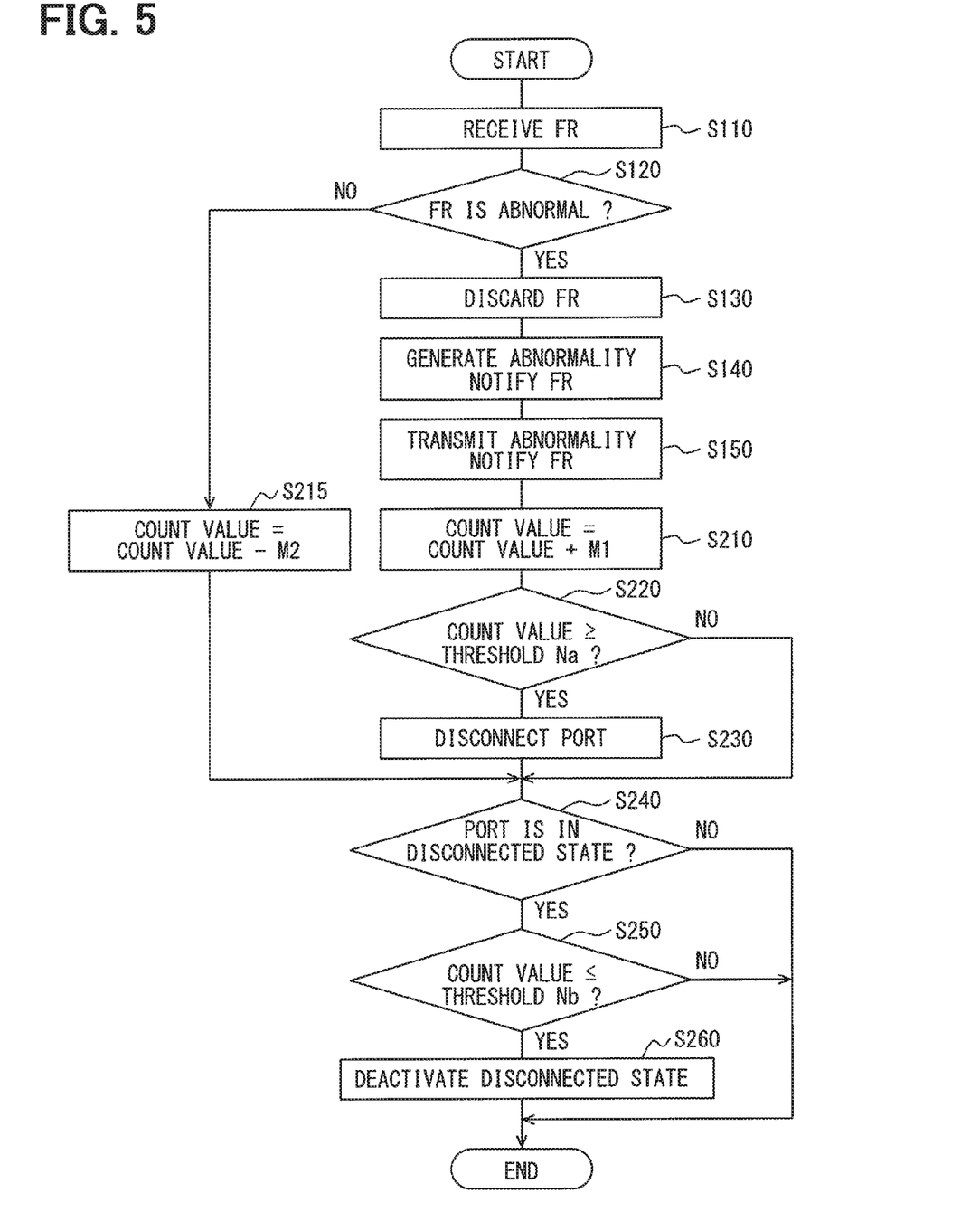
FIG. 5 is a flowchart of an abnormality treating process according to a third embodiment of the present disclosure.

As shown in FIG. 5, after transmitting the abnormality notification frame at S150, the controller 25 proceeds to S210. At S210, the controller 25 adds a predetermined weight coefficient M1 to the count value. Herein, the predetermined weight coefficient M1 is greater than zero. Herein, the count value corresponds to an evaluation value indicating a frequency by which the received frames have abnormalities. A greater value of the count value indicates a higher frequency by which the received frames have abnormalities. An initial value of the count value is set to zero.

At S220, the controller 25 determines whether the count value is equal to or greater than a predetermined first threshold Na. When determining that the count value is equal to or greater than the predetermined first threshold Na, the controller 25 proceeds to S230. At S230, the port disconnector 41 in the controller 25 performs the port disconnection process for disconnecting the subject port similar to S180 shown in FIG. 3 and FIG. 4. Then, the controller 25 proceeds to S240.

The predetermined first threshold Na is set to be greater than the weight coefficient M1, and is set to be multiple of the weight coefficient M1. For example, the first threshold Na may be set to be integer multiple, such as 20 times of the weight coefficient M1. In the present embodiment, after disconnection of the subject port, the controller 25 monitors the subject port. Specifically, the controller 25 monitors whether the number of frames that are received by the subject port and are determined to be normal, is increased. When the number of frames that are received by the subject port and determined to be normal increases, the controller 25 deactivates the disconnection of the subject port. Thus, in the port disconnection process of S230, the controller 25 does not stop the operation of the transceiver included in the subject port. Instead, the controller 25 forbids the relay of frames between the subject port and any one of remaining ports.

At S220, when the controller determines that the count value is smaller than the first threshold Na, the controller 25 proceeds to S240. At S120, when the controller 25 determines that the received frame is normal, the controller 25 proceeds to S215. At S215, the controller 25 subtracts a predetermined weight coefficient M2 from the count value. Herein, the predetermined weight coefficient M2 is set to be greater than zero. Then, the controller 25 proceeds to S240.

At S240, the controller 25 determines whether the subject port is in the disconnected state. When the controller 25 determines that the subject port is not in the disconnected state, the controller 25 ends the abnormality treating process. When the controller 25 determines that the subject port is in the disconnected state, the controller 25 proceeds to S250.

At S250, the controller 25 determines whether the count value is equal to or smaller than a predetermined second threshold Nb. Herein, the second threshold Nb is set to be smaller than the first threshold Na. The second threshold Nb functions as a reconnection threshold. When determining that the count value is greater than the second threshold Nb (S250: NO), the controller 25 ends the abnormality treating process. When determining that the count value is equal to or smaller than the second threshold Nb (S250: YES), the controller 25 proceeds to S260.

At S260, the port reconnector 42 in the controller 25 activates the connection of the subject port from the disconnected state by reconnection. That is, the disconnection of the subject port is deactivated. Thus, the subject port is included again in the destinations of the relay operation. Specifically, as the reconnection process of the subject port, the controller 25 deactivates the relay forbiddance process carried out at S230. Then, the controller 25 ends the abnormality treating process.

By executing S210 and S215 shown in FIG. 5, the count value indicating the frequency by which the frames received at S120 are determined to be abnormal is updated. Herein, the count value indicating the frequency by which the frames received at S120 are determined to be abnormal is defined based on an abnormal receiving count indicating the count by which the frames received at S120 are determined to be abnormal and a normal receiving count indicating the count by which the frames received at S120 are determined to be normal.

Specifically, each time the frame received at S120 is determined to be abnormal, the count value is incremented by an amount corresponding to the weight coefficient Ml. Each time the frame received at S120 is determined to be normal, the count value is decremented by an amount corresponding to the weight coefficient M2. The weight coefficient M1 corresponds to a first coefficient, the weight coefficient M2 corresponds to a second coefficient. Thus, from a value obtained by multiplying the abnormal receiving count with the first coefficient, a value obtained by multiplying the normal receiving count with the second coefficient is subtracted and the remaining obtained by the subtraction is calculated as the count value by the calculator 44 in the controller 25.

In the abnormality treating process shown in FIG. 5, when the count value becomes equal to or greater than the first threshold Na, the subject port is disconnected (S220: YES and S230). When the count value becomes equal to or smaller than the second threshold Nb, the disconnection of the subject port is deactivated and the subject port is reconnected (S250: YES and S260). The abnormality treating process shown in FIG. 5 is carried out for each port 21, 22, 23.

According to the Ethernet switch 10 in the present embodiment, advantages similar to the first embodiment and the second embodiment can be provided. Further, for the disconnected port, that is, the port excluded from the destinations of the relay operation, the disconnection is deactivated when the normal receiving count is increased. Thus, all of the relay operation among the ports 21, 22, 23 can be properly reactivated to the normal communication state.

In order to reliably avoid the relay of the frame which probably has the abnormality, the condition set for the deactivation of the disconnected port is more strict than the condition set for the disconnection of the port. Thus, the weight coefficient M2 functioning as the second coefficient is set to have a smaller value than the weight coefficient M1 functioning as the first coefficient.

In the present embodiment, as shown in FIG. 5, the process executed at S210 and S215 functions as an example of a calculator, the process executed at S220 and S230 functions as an example of the port disconnecting section, and the process executed at S250 and S260 functions as an example of a port reconnecting section.

The following will describe modifications of the third embodiment.

(First Modification)

In this modification, the abnormality treating process may be modified as the following.

First, at S210, the abnormal count value for recording the count by which the abnormal frames are received is counted up. Second, at S215, the normal count value for recording the count by which the normal frames are received is counted up.

Third, between S210 and S220, an additional step may be added and in this added step, the count value may be calculated using a formula (abnormal count value×weight coefficient M1)−(normal count value×weight coefficient M2).

In the above-described configurations, advantages similar to the abnormality treating process shown in FIG. 5 can be provided.

(Second Modification)

In the abnormality treating process shown in FIG. 5, process executed at S240, S250, and S260 may be omitted. In this case, in the port disconnection process of S230, the transceiver of the subject port can be deactivated for disconnecting the subject port.

(Fourth Embodiment)

The following will describe a communication system according to a fourth embodiment of the present disclosure. Compared with the first to third embodiments, in the communication system according to the present embodiment, the controller 25 of the Ethernet switch 10 further executes a relay disabled notification process shown in FIG. 6.

The relay disabled notification process is carried out for the disconnected port among the multiple ports 21, 22, 23. The disconnected port is a port which is disconnected at S180 shown in FIG. 3 or FIG. 4, or is disconnected at S230 shown in FIG. 5. The relay disabled notification process may be executed at predetermined time intervals. Alternatively, the relay disabled notification process may be started in response to a reception of the frame from a port other than the disconnected port.

Figure 6:
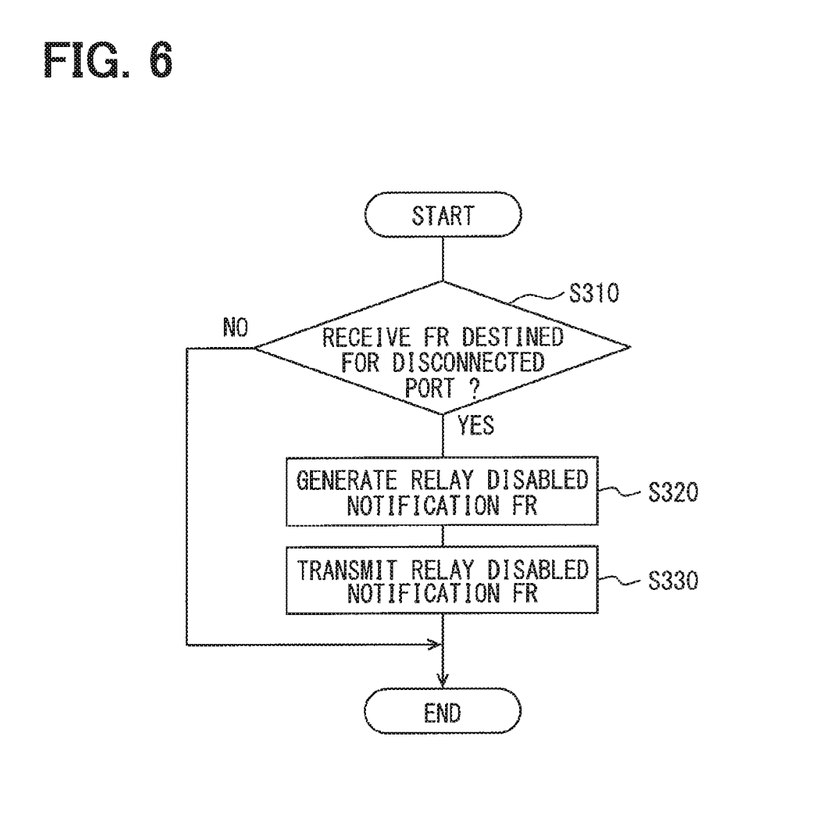
FIG. 6 is a flowchart of an abnormality treating process according to a fourth embodiment of the present disclosure.

As shown in FIG. 6, in the relay disabled notification process, the relay disabled notifier 45 in the controller 25 determines at S310 whether a frame, which is destined for the disconnected port and is transmitted from a port other than the disconnected port, is received by the disconnected port. Herein the frame destined for the disconnected port is a frame that is destined for the ECU connected with the disconnected port.

When the controller 25 determines that a frame, which is destined for the disconnected port and is transmitted from a port other than the disconnected port, is not received (S310: NO), the controller 25 ends the relay disabled notification process. When determining that the frame destined for the disconnected port is received (S310: YES), the controller 25 proceeds to S320.

At S320, the controller 25 generates a relay disabled notification frame. The relay disabled notification frame is a frame that notifies of the disablement of the relay operation to the ECU which transmitted the frame destined for the disconnected port. Hereinafter, the ECU that transmits the frame destined for the disconnected port is also referred to as a transmission execution ECU. The transmission execution ECU functions as an example of a transmission execution device.

Among the fields of the relay disabled notification frame, for example, at a predetermined position of the VLAN tag field, an identification code indicating the frame is a relay disabled notification frame may be stored.

In MAC address field of the relay disabled notification frame, a MAC address indicating the transmission execution ECU may be stored. In data field of the relay disabled notification frame, the data stored in the data field of the frame transmitted from the transmission execution ECU may be stored by making a copy of the data. Thus, the transmission execution ECU that receives the relay disabled notification frame can identify, based on the data stored in the data field of the relay disabled notification frame, the relay disabled notification frame corresponds to which frame the transmission execution ECU has transmitted. That is, the transmission execution ECU can determine which frame has failed to be relayed to the destination ECU. The data stored in the data field of the relay disabled notification frame corresponds to the relay disabled frame information. As described above, based on the relay disabled frame information, the transmission execution ECU can identify the relay disabled notification frame corresponds to which frame the transmission execution ECU has transmitted.

As another example, the ECU 11, 12,13 may store the sequence number of the frame in the VLAN tag field of the frame to be transmitted. In this case, the controller 25 may copy the sequence number stored in the VLAN tag field of the received frame and writes the copied sequence number in the VLAN tag field of the relay disabled notification frame. In this configuration, the transmission execution ECU can identify, based on the sequence number included in the relay disabled notification frame, that the relay disabled notification frame corresponds to which frame the ECU has transmitted. In this case, the sequence number included in the relay disabled notification frame corresponds to the relay disabled frame information.

Similar to the abnormality notification frame, in the relay disabled notification frame, the sequence number may be stored in a predetermined position in the data field of the frame. Further, as the relay disabled frame information to be included in the relay disabled notification frame, both the sequence number included in the frame transmitted from the transmission execution ECU and the data stored in the data field of the frame transmitted from the transmission execution ECU can be used.

After generating the relay disabled notification frame, the controller 25 transmits the relay disabled notification frame to a port connected with the transmission execution ECU at S330. Herein, the port connected with the transmission execution ECU is a port that has received the frame destined for the disconnected port. Then, the transmitted relay disabled notification frame is received by the transmission execution ECU.

After transmitting the relay disabled notification frame at S330, the controller 25 ends the relay disabled notification process.

As described above, in the present embodiment, the transmission execution ECU that has transmitted a frame destined for the disconnected port is notified of the relay disablement of the transmitted frame by the relay disabled notification frame. Thus, the transmission execution ECU can properly perform a fail-safe process in order to avoid or suppress a malfunction caused by the transmission failure of the frame to the destination ECU.

When the transmission execution ECU receives the relay disabled notification frame, the transmission execution ECU can generally determine that a transmission failure has occurred in the previously transmitted frame. As described above, the relay disabled notification frame includes the relay disabled frame information. Thus, the transmission execution ECU can correctly identify, based on the relay disabled frame information included in the relay disabled notification frame, which frame has failed to be transmitted to the destination after being transmitted. Thus, the transmission execution ECU may properly and correctly select the fail-safe process to be carried out as a measure to the transmission failure.

In the present embodiment, the process executed at S310, S320, and S330 in FIG. 6 functions as an example of a relay disabled notifying section.

(Other Embodiments)

In the abnormality notification frame, the identification code indicating the frame is the abnormality notification frame may be stored at any one position in the data field other than the VLAN tag field. The arrangement of the relay disabled frame information in the relay disabled notification frame is also not limited by the above-described example. The present disclosure is also applied to a relay apparatus operating according to a standard other than the Ethernet standard.

In addition to the Ethernet switch 10, the present disclosure may also be implemented as a communication system including the Ethernet switch 10 as a configuration element, a program or program product that controls a computer to function as the Ethernet switch 10, a non-transitory computer readable storage medium comprising the program or the program product, a relay control method or the like.

It is noted that a flowchart or the processing of the flowchart in the present disclosure includes sections (also referred to as steps), each of which is represented, for instance, as S110. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A relay apparatus which relays a communication among a plurality of control devices comprising:
   a plurality of ports connected with the plurality of control devices, respectively, via a plurality of communication lines;
   a determiner determining whether a reception frame transmitted from each of the plurality of control devices and received by each of the plurality of ports is normal or abnormal;
   a discarder discarding the reception frame when the determiner determines that the reception frame is abnormal;
   a port disconnector disconnecting, among the plurality of ports, one port connected to the one of the plurality of control devices that transmitted the reception frame determined to be abnormal by excluding the one port from relay destinations of the communication;

a relay disabled notifier transmitting a relay disabled notification frame to a transmission execution device when one of the remaining ports excluding the one port that has been disconnected transmits a frame destined for the control device connected to the one port that has been disconnected; and a calculator calculating, for each of the plurality of ports, an evaluation value indicating a frequency at which reception frames are determined to be abnormal by the determiner based on an abnormal receiving count and a normal receiving count, wherein the abnormal receiving count indicates a count by which the reception frames are determined to be abnormal by the determiner, and the normal receiving count indicates a count by which the reception frames are determined to be normal by the determiner, wherein the relay disabled notification frame indicates a relay of the frame destined for the one port that has been disconnected is disabled, the transmission execution device is one of the plurality of control devices which transmitted the frame destined for the one port that has been disconnected, the port disconnector disconnects, among the plurality of ports, one port having the evaluation value equal to or greater than a predetermined threshold by excluding the one port from relay destinations of the communication, the calculator calculates the evaluation value by subtracting a value obtained by multiplying the normal receiving count with a second coefficient from a value obtained by multiplying the abnormal receiving count with a first coefficient, and the second coefficient has a smaller value than the first coefficient.

2. The relay apparatus according to claim 1, wherein an abnormality notification frame includes information based on which the transmission source device is capable of identifying one frame corresponding to the abnormality notification frame among a plurality of frames transmitted by the transmission source device.

3. The relay apparatus according to claim 1, further comprising:

an abnormality counter counting, for each of the plurality of ports, a quantity of reception frames that are determined to be abnormal by the determiner, wherein the port disconnector disconnects, among the plurality of ports, one port having the quantity of reception frames determined to be abnormal equal to or greater than a predetermined threshold by excluding the one port from relay destinations of the communication.

4. The relay apparatus according to claim 3, wherein the port disconnector deactivates an operation of a transceiver included in the one port to be disconnected for excluding the one port from the relay destinations of the communication.

5. The relay apparatus according to claim 1, further comprising:

a continuous abnormal counter counting, for each of the plurality of ports, a quantity of reception frames that are continuously determined to be abnormal by the determiner, wherein the port disconnector disconnects, among the plurality of ports, one port having the quantity of reception frames continuously determined to be abnormal equal to or greater than a predetermined threshold by excluding the one port from relay destinations of the communication.

6. The relay apparatus according to claim 1, further comprising a port reconnector reconnecting the one port that has been disconnected as the relay destinations of the communication when the evaluation value corresponding to the one port decreases equal to or lower than a reconnection threshold, and the reconnection threshold is set to be smaller than the predetermined threshold referred for disconnecting the one port.

7. The relay apparatus according to claim 1, wherein the relay disabled notification frame includes information based on which the transmission execution device is capable of identifying one frame corresponding to the relay disabled notification frame among a plurality of frames transmitted by the transmission execution device.

8. The relay apparatus according to claim 1, wherein the determiner performs:

a bit number determination for determining whether a bit number of the reception frame is equal to a normal value; and an error detection for detecting a data error in the reception frame using an error detection purpose data included in the reception frame, when the determiner determines that the bit number of the reception frame is not equal to the normal value or detects the data error in the reception frame, the determiner determines that the reception frame is abnormal, when the determiner determines that the bit number of the reception frame is equal to the normal value and detects no data error in the reception frame, the determiner determines that the reception frame is normal, and the bit number of the reception frame is a number of bits of each field, a predetermined field, or entire field of the reception frame.

9. A relay apparatus which relays a communication among a plurality of control devices comprising:

a plurality of ports connected with the plurality of control devices, respectively, via a plurality of communication lines;

a determiner determining whether a reception frame transmitted from each of the plurality of control devices and received by each of the plurality of ports is normal or abnormal;

a discarder discarding the reception frame when the determiner determines that the reception frame is abnormal;

an abnormality notifier, when the determiner determines that the reception frame is abnormal, transmitting an abnormality notification frame for notifying of an abnormality occurrence in the reception frame to one of the plurality of control devices that transmitted the reception frame determined to be abnormal; and a calculator calculating, for each of the plurality of ports, an evaluation value indicating a frequency at which reception frames are determined to be abnormal by the determiner based on an abnormal receiving count and a normal receiving count, wherein the abnormal receiving count indicates a count by which the reception frames are determined to be abnormal by the determiner, and the normal receiving count indicates a count by which the reception frames are determined to be normal by the determiner, wherein the abnormality notification frame includes information based on which the transmission source device is capable of identifying one frame corresponding to the abnormality notification frame among a plurality of frames transmitted by the transmission source device, a port disconnector disconnects, among the plurality of ports, one port having the evaluation value equal to or greater than a predetermined threshold by excluding the one port from relay destinations of the communication, the calculator calculates the evaluation value by subtracting a value obtained by multiplying the normal receiving count with a second coefficient from a value obtained by multiplying the abnormal receiving count with a first coefficient, and the second coefficient has a smaller value than the first coefficient.

10. A relay apparatus which relays a communication among a plurality of control devices comprising:

a plurality of ports connected with the plurality of control devices, respectively, via a plurality of communication lines;

a determiner determining whether a reception frame transmitted from each of the plurality of control devices and received by each of the plurality of ports is normal or abnormal;

a discarder discarding the reception frame when the determiner determines that the reception frame is abnormal;

an abnormality notifier, when the determiner determines that the reception frame is abnormal, transmitting an abnormality notification frame for notifying of an abnormality occurrence in the reception frame to one of the plurality of control devices that transmitted the reception frame determined to be abnormal;

a calculator calculating, for each of the plurality of ports, an evaluation value indicating a frequency at which reception frames are determined to be abnormal by the determiner based on an abnormal receiving count and a normal receiving count, wherein the abnormal receiving count indicates a count by which the reception frames are determined to be abnormal by the determiner, and the normal receiving count indicates a count by which the reception frames are determined to be normal by the determiner; and a port disconnector disconnecting, among the plurality of ports, one port having the evaluation value equal to or greater than a predetermined threshold by excluding the one port from relay destinations of the communication, wherein the calculator calculates the evaluation value by subtracting a value obtained by multiplying the normal receiving count with a second coefficient from a value obtained by multiplying the abnormal receiving count with a first coefficient, and the second coefficient has a smaller value than the first coefficient.

* * * * *